United States Patent

Maeda

Patent Number: 5,826,199
Date of Patent: Oct. 20, 1998

[54] DIGITAL PORTABLE TELEPHONE WITH VOICE RECOGNITION AND VOICE CODEC PROCESSING ON SAME DIGITAL SIGNAL PROCESSOR

[75] Inventor: Koji Maeda, Tokyo, Japan

[73] Assignee: NEC Corporation, Tokyo, Japan

[21] Appl. No.: 919,506

[22] Filed: Aug. 28, 1997

Related U.S. Application Data

[63] Continuation of Ser. No. 490,554, Jun. 15, 1995.

[30] Foreign Application Priority Data

Jun. 15, 1994 [JP] Japan .................................. 6-156517

[51] Int. Cl.⁶ ...................................................... H04Q 7/20
[52] U.S. Cl. ............................ 455/563; 455/550; 455/569; 455/575
[58] Field of Search ...................................... 455/403, 426, 455/462, 550, 563, 564, 569, 575, 90; 379/67, 88, 89

[56] References Cited

U.S. PATENT DOCUMENTS

| | | | |
|---|---|---|---|
| 4,712,242 | 12/1987 | Rajasekaran et al. | 381/42 |
| 4,737,976 | 4/1988 | Borth et al. | 379/58 |
| 4,764,953 | 8/1988 | Chren et al. | 379/355 |
| 4,882,757 | 11/1989 | Fisher et al. | 381/43 |
| 5,228,074 | 7/1993 | Mizikovsky | 379/59 |
| 5,416,829 | 5/1995 | Umemoto | 379/58 |
| 5,420,912 | 5/1995 | Kopp et al. | 379/58 |
| 5,465,401 | 11/1995 | Thompson | 455/89 |
| 5,592,556 | 1/1997 | Schwed | 380/49 |

Primary Examiner—Curtis A. Kuntz
Assistant Examiner—Nay Maung
Attorney, Agent, or Firm—Sughrue, Mion, Zinn, Macpeak & Seas, PLLC

[57] ABSTRACT

A microcomputer detects the on-line state or the wait state based on reception demodulated data and operation information from an operation unit and notifies a digital signal processor of either state, while the digital signal processor operates in a voice recognition processing mode for recognizing the contents of voice input through a transmitter when notified of the wait state and operates in a voice codec processing mode for conducting voice codec processing with respect to demodulated data from a decoder or voice data which is input from the transmitter and converted into a digital signal.

13 Claims, 5 Drawing Sheets

FIG.2

KEY LAYOUT ON OPERATION UNIT

| 1 | 2 | 3 | POWER SOURCE |
|---|---|---|---|
| 4 | 5 | 6 | VOICE |
| 7 | 8 | 9 | START |
| * | 0 | # | END |

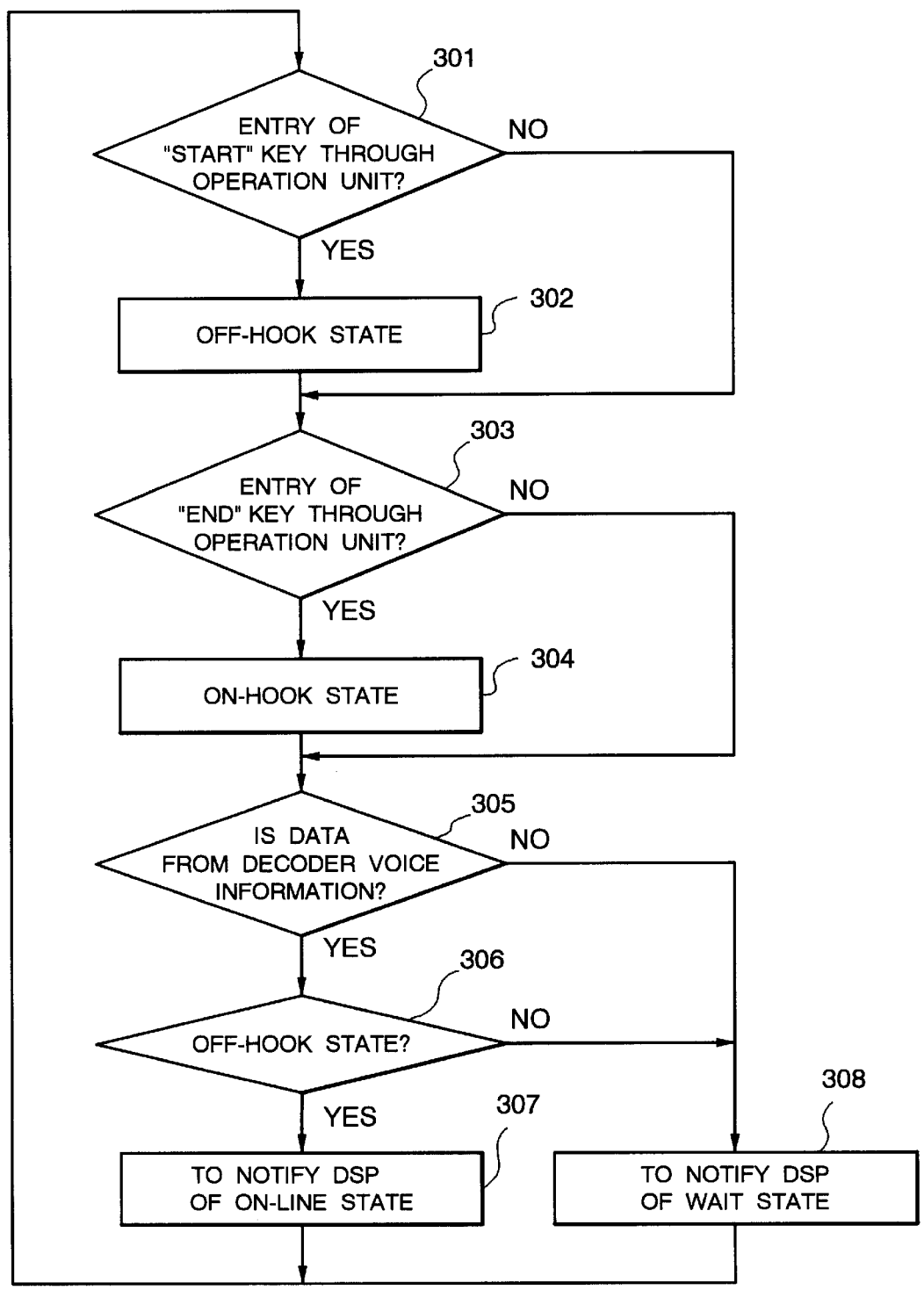

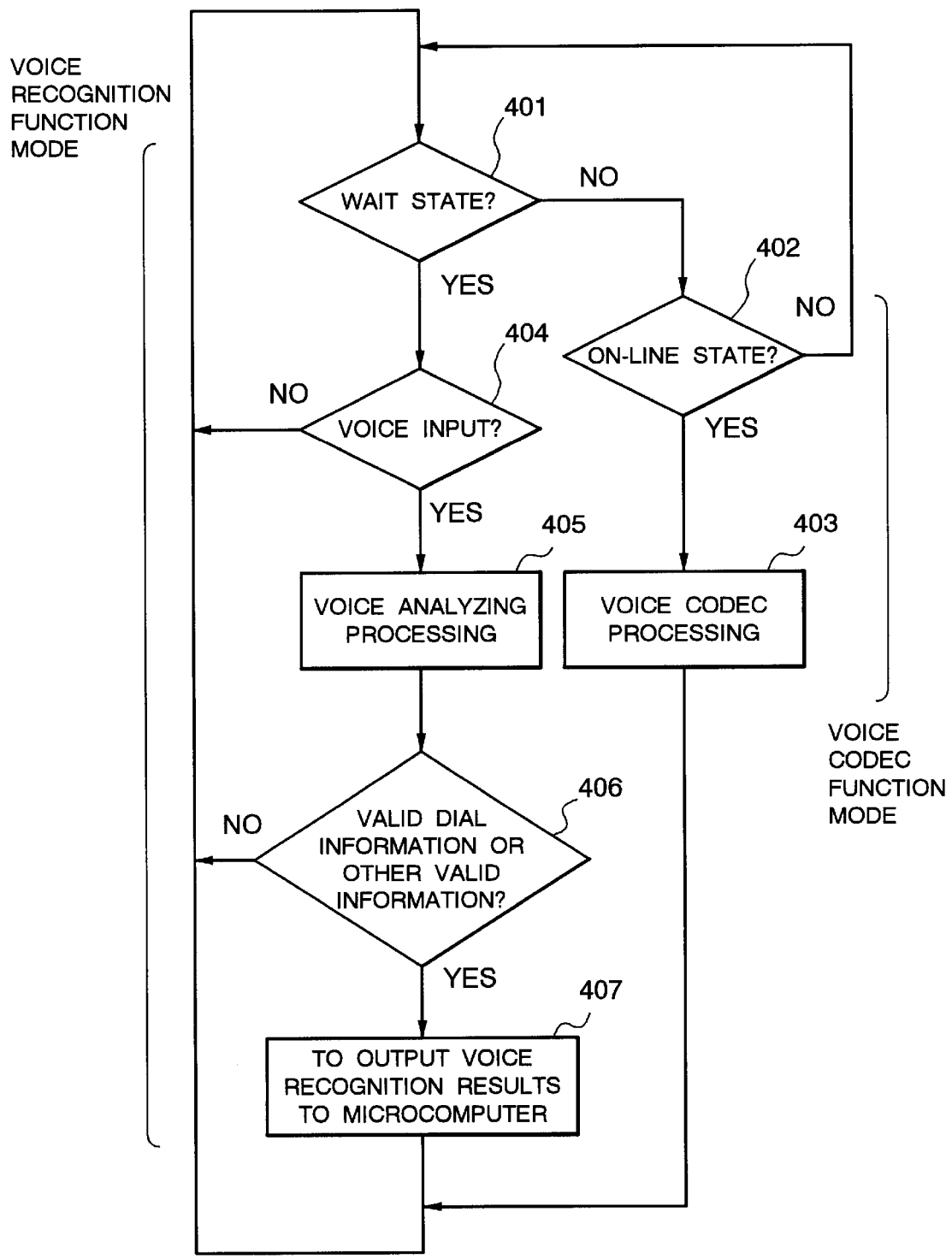

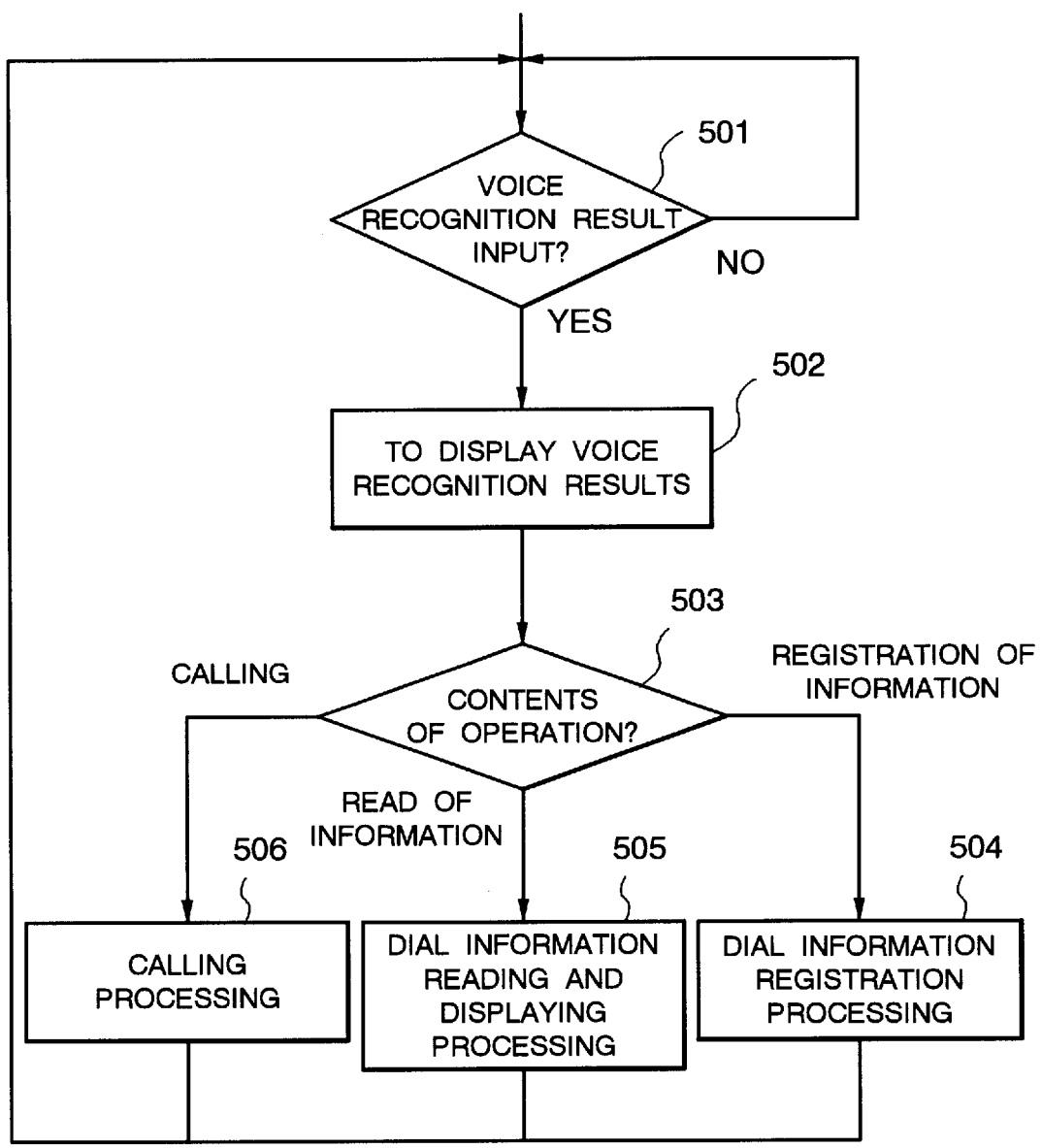

DIGITAL PORTABLE TELEPHONE WITH VOICE RECOGNITION AND VOICE CODEC PROCESSING ON SAME DIGITAL SIGNAL PROCESSOR

This is a continuation of application Ser. No. 08/490,554 filed Jun. 15, 1995.

BACKGROUND OF THE INVENTION

1. Field of the Invention

The present invention relates to digital portable telephones and, more particularly, a digital portable telephone which implements a voice recognition function and a voice codec function by using a digital signal processor (DSP).

2. Description of the Related Art

For transmission with conventional digital portable telephones, a sound signal from a transmitter is converted into a digital signal and voice codec processing is conducted with respect to the digitally converted sound signal by a digital signal processor (DSP). Then, voice data obtained by the voice codec processing is encoded by an encoder and the encoded data is converted into a signal having a radio frequency by a radio unit and transmitted by radio.

For reception, a radio signal sent from a base station or the like is received by the radio unit and converted to have a predetermined frequency band. Thereafter, the converted signal is subjected to decoding processing, and then to voice codec processing in a DSP to sound through a receiver.

In conventional digital portable telephones, a DSP is used for conducting digital signal processing and voice codec processing with respect to a transmission sound signal or a reception sound signal in the on-line state. DSP is provided, for example, as a DSP chip to implement, as firmware, V-CELP system processing which is the specification of the digital portable telephone system in Japan and the U.S.

On the other hand, there is an increasing demand for small-sized and light-weight digital portable telephones in recent years. A major obstacle to the realization of small-sized and light-weight digital portable telephones is an input operation unit such as a keyboard switch. More specifically, there is a limit to reduction of an input operation unit in size which has switches for inputting dial numbers etc. because of the need for maintaining operability. This is one of the constraints on reduction of portable digital telephones in size and weight.

One solution to this problem has been to input operation information by means of voice instead of inputting dial numbers and other information through a keyboard. More specifically, inputting operation information, which conventionally is input through keyboard switches on an input operation unit, is input instead by means of voice to reduce the number of switches and the like on the keyboard, thereby minimizing the size of the input operation unit.

In particular, with the advent of a small-packaged DSP with high processible capability as a result of the recent rapid improvement of DSP technologies, it has become possible to provide an additional circuit employing a DSP with the above-described function to recognize input voice information.

However, the above voice codec processing and voice recognition processing are completely independent functions. In addition, if the above-mentioned voice codec processing function is implemented as firmware of a DSP, it is impossible to implement the voice codec processing function and the voice recognition processing function by the single DSP because the DSP requires the capability of some 30 MIPS.

Conventional digital portable telephones therefore still use two DSPs, one for voice codec processing and the other for voice recognition processing. Provision of two packages for dedicated DSPs prevents reduction in scale, weight, and cost of the portable telephones.

SUMMARY OF THE INVENTION

An object of the present invention is to solve the above problems and provide a digital portable telephone which contains a single DSP for implementing both a voice codec function and a voice recognition function and consequently allows reduction of the telephone in cost, size and weight, while maintaining the voice recognition function.

According to one aspect of the invention, a digital portable telephone includes:

a digital signal processor for performing voice codec processing with respect to transmission voice data which is input through a transmitter and digitalized and reception demodulated data obtained by decoding a reception radio signal;

encoding means for encoding transmission voice data having been subjected to voice codec processing to generate modulated data;

transmission means for converting said modulated data into a signal with a radio frequency and transmitting the signal by radio;

means for converting voice information extracted from the reception demodulated data by the voice codec processing into an analog signal and outputting the analog signal to a receiver;

operation means for operating input of a dial number of a destination and input for transmission and reception operation, and for displaying various kinds of information; and detection means for detecting whether the telephone is in the on-line state or the wait state based on said reception demodulated data and operation information from said operation means to notify said digital signal processor of either state;

said digital signal processor being operable
  in a voice recognition processing mode for recognizing the contents of voice input through said transmitter when notified of the wait state by said detection means; and
  in a voice codec processing mode for conducting said voice codec processing with respect to demodulated data from a decoder or voice data from said transmitter converted into a digital signal when notified of the on-line state.

In the preferred construction, the detection means detects the on-line state only when start of a call is indicated by said operation means and said demodulated data is voice information and otherwise detects the wait state.

In the preferred construction, the detection means notifies the on-line state only when the telephone is in the off-hook state and said demodulated data is voice information and otherwise notifies the wait state.

Also, the detection means determines whether indication of call start is input by said operation means and sets the telephone to the off-hook state when the indication of call start is input;

determines whether indication of call end is input by said operation means and sets the telephone to the on-hook state when the indication of call end is input;

determines whether said demodulated data is voice information;

further determines whether the telephone is in the off-hook state when said demodulated data is voice information and notifies the state of call when in the off-hook state; and notifies the wait state when said demodulated data is not voice information or when said demodulated data is voice information but the telephone is not in the off-hook state.

In the above-mentioned construction, the digital signal processor determines in the wait state whether voice data is input from said transmitter;

when voice data is input, analyzes the voice data to conduct recognition processing; and determines based on the recognition processing result whether the data is valid information or not and outputs the recognition result when it is valid.

In the above-mentioned construction, the digital portable telephone further comprises control means for receiving input of voice recognition results obtained by said digital signal processor and displaying the recognition results on a display unit of said operation means.

In the above-mentioned construction, the control means conducts predetermined processing based on the voice recognition results input from said digital signal processor and the contents of indication input from said operation means.

According to another aspect of the invention, a digital portable telephone comprising:

a digital signal processor for performing voice codec processing with respect to transmission voice data which is input through a transmitter and digitalized and reception demodulated data obtained by decoding a reception radio signal;

encoding means for encoding transmission voice data having been subjected to voice codec processing to generate modulated data;

transmission means for converting said modulated data into a signal with a radio frequency and transmitting the signal by radio;

means for converting voice information extracted from the reception demodulated data by the voice codec processing into an analog signal and outputting the analog signal to a receiver;

operation means for operating input of a dial number of a destination and input for transmission and reception operation, and for displaying various kinds of information; and detection means for detecting whether the telephone is in the on-line state or the wait state based on said reception demodulated data and operation information from said operation means to notify said digital signal processor of either state; wherein said digital signal processor is operable in a voice recognition processing mode for recognizing the contents of voice input through said transmitter when notified of the wait state by said detection means; and in a voice codec processing mode for conducting said voice codec processing with respect to demodulated data from a decoder or voice data from said transmitter converted into a digital signal when notified of the on-line state; and said detection means notifies the on-line state only when the telephone is in the on-hook state and said demodulated data is voice information and otherwise notifies the wait state.

In the preferred construction, the detection means determines whether indication of call start is input by said operation means and sets the telephone to the off-hook state when the indication of call start is input;

determines whether indication of call end is input by said operation means and sets the telephone to the on-hook state when the indication of call end is input;

determines whether said demodulated data is voice information;

further determines whether the telephone is in the off-hook state when said demodulated data is voice information and notifies the state of call when in the off-hook state; and notifies the wait state when said demodulated data is not voice information or when said demodulated data is voice information but the telephone is not in the off-hook state; and said digital signal processor determines in the wait state whether voice data is input from said transmitter;

when voice data is input, analyzes the voice data to conduct recognition processing; and determines based on the recognition processing result whether the data is valid information or not and outputs the recognition result when it is valid.

In the above-mentioned construction, the digital portable telephone further comprises control means for receiving input of voice recognition results obtained by said digital signal processor and displaying the recognition results on a display unit of said operation means.

According to a still further aspect of the invention, in a digital portable telephone having a digital signal processor which conducts voice codec processing with respect to transmission voice data input through a transmitter and digitalized, and reception demodulated data obtained by decoding a reception radio signal, a method for switching and controlling functions of the digital signal processor, comprising the steps of:

detecting the on-line state when the telephone is in the off-hook state and said demodulated data is voice information and otherwise detecting the wait state;

setting the operation mode of said digital signal processor to a voice codec processing mode for conducting said voice codec processing when detecting said on-line state; and setting the operation mode of said digital signal processor to a voice recognition processing mode for recognizing the contents of voice input through the transmitter when detecting said wait state.

In this case, the method for switching and controlling functions of a digital signal processor in a digital portable telephone comprises the steps of:

determining whether indication of call start is input by operation means and setting the telephone to the off-hook state when the indication of call start is input;

determining whether indication of call end is input by said operation means and setting the telephone to the on-hook state when the indication of call end is input;

determining whether said demodulated data is voice information;

further determining whether the telephone is in the off-hook state when said demodulated data is voice information and notifying the state of call when in the off-hook state; and notifying the wait state when said demodulated data is not voice information or when said demodulated data is voice information but the telephone is not in the off-hook state.

In this case, the digital signal processor determines in the wait state whether voice data is input from said transmitter;

when voice data is input, analyzes the voice data to conduct recognition processing; and determines based on the recognition processing result whether the data is valid information and outputs the recognition result when it is valid.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a diagram showing one example of a keyboard layout of an operation unit of the digital portable telephone according to the present embodiment.

FIG. 3 is a flowchart for use in explaining processing to be conducted by a microcomputer of the digital portable telephone for detecting the on-line state and the wait state according to the present embodiment.

FIG. 4 is a flowchart for use in explaining operation of a DSP of the digital portable telephone according to the present embodiment.

FIG. 5 is a flowchart for use in explaining processing conducted by the microcomputer upon receiving voice recognition results from the DSP.

DESCRIPTION OF THE PREFERRED EMBODIMENT

Figure 1:
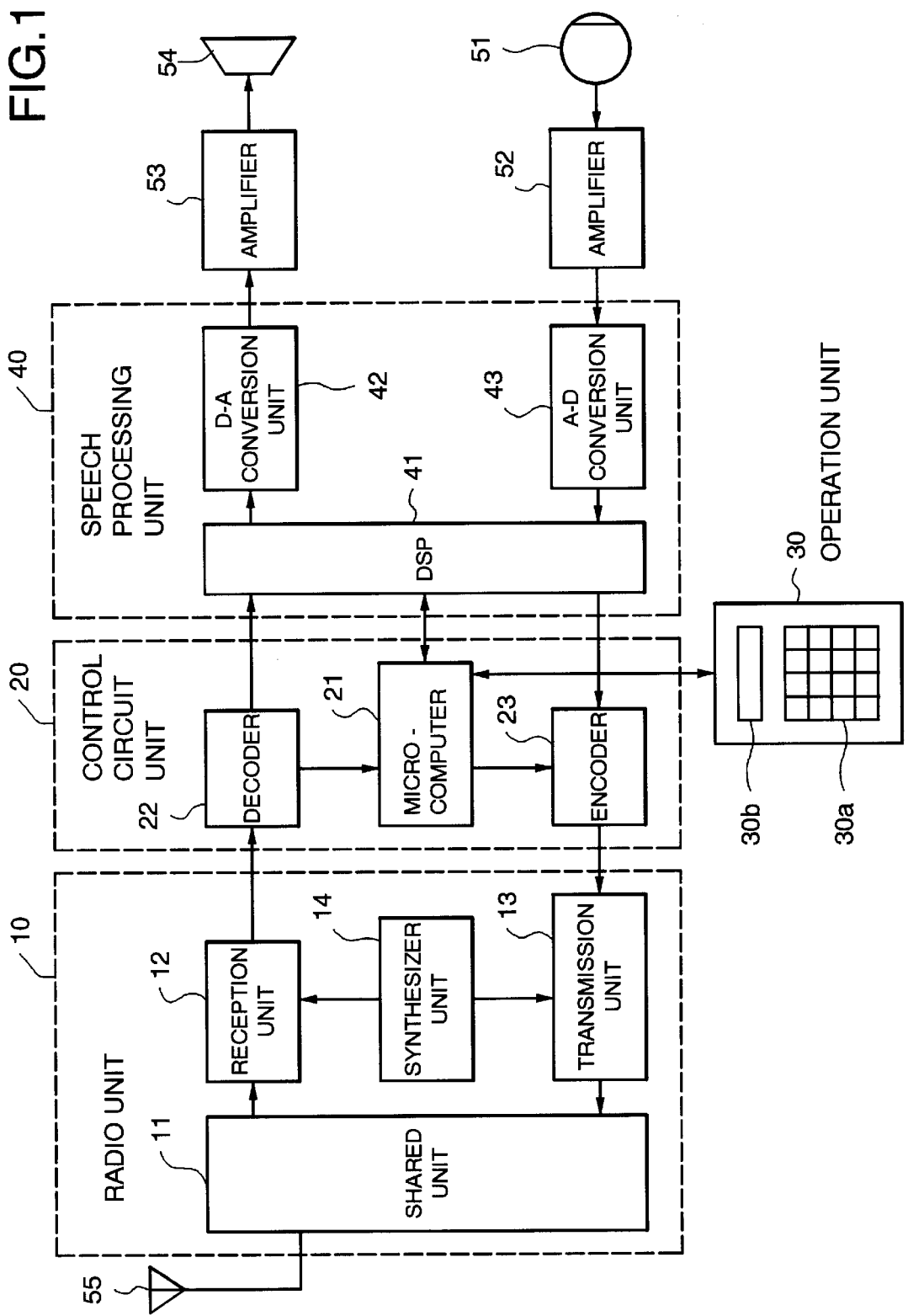
FIG. 1 is a block diagram showing a structure of a digital portable telephone according to one embodiment of the present invention.

A preferred embodiment of the present invention will be described in detail with reference to accompanying drawings.

FIG. 1 is a block diagram showing the structure of a digital portable telephone according to a preferred embodiment of the present invention. In the present invention, a digital signal processor (DSP) in a speech processing unit is provided to have functions and to be switched for use corresponding to states of use of the portable telephone such that it operates in the voice recognition function when the telephone is in the wait state and in the voice codec function when in the on-line state, whereby the single DSP in a small-sized package can implement both the voice codec and voice recognition functions.

As shown in FIG. 1, the digital portable telephone of the present embodiment includes a radio unit 10, a control circuit unit 20, an operation unit 30, a speech processing unit 40, a transmitter 51, amplifiers 52 and 53, and a receiver 54.

The radio unit 10, which is a circuit unit for transmitting and receiving a sound signal by radio, includes a shared unit 11 connected to an antenna 55, a reception unit 12, a transmission unit 13, and a synthesizer unit 14 for supplying a frequency converting signal (local oscillating frequency) to the reception unit 12 and the transmission unit 13.

The control circuit unit 20, which is a circuit unit for controlling the radio unit 10 and the speech processing unit 40, includes a microcomputer 21, a decoder 22 for decoding reception data, and an encoder 23 for encoding reception data to generate modulated data.

The microcomputer 21 is a circuit as a main part of the present embodiment, which is provided with a function of detecting the wait state and the on-line state.

The speech processing unit 40 includes one DSP 41, a D-A conversion unit 42 for digital-to-analog converting a signal output from the DSP 41, and an A-D conversion unit 43 for analog-to-digital converting a signal output from the amplifier 52. The transmitter 51 converts voice into a sound signal as an electric signal. The receiver 54 converts an applied sound signal into voice.

The operation unit 30 includes a keyboard unit 30a for input operation and a display unit 30b where display is made by a liquid crystal display, for example. As shown in FIG. 2, the keyboard unit 30a is composed of numeric keys "0" to "9", symbolic keys such as "*" and "#" and character keys, "power source", "voice", "start" and "end", all of which are arranged in matrix. The "power source" key indicates ON/OFF of the power source of the digital portable telephone. The "voice" key, the "start" key and the "end" key are operation keys for inputting voice, for starting a call and for ending a call, respectively.

An outline of the ordinary transmission and reception operations of this digital portable telephone will be described in the following. At the time of reception, a signal (sound signal) having a radio frequency received through the antenna 55 and the shared unit 11 is supplied to the reception unit 12, where the signal has its frequency converted with a frequency converting signal from the synthesizer unit 14 into a signal having an intermediate frequency or a baseband signal. Then, the intermediate frequency signal or the baseband signal is supplied to the decoder 22, decoded there and supplied to the DSP 41 as input demodulated data.

The DSP 41 extracts voice information from the input demodulated data and supplies the voice information to the D-A conversion unit 42. The voice information is converted into an analog sound signal by the D-A conversion unit 42. Then, the analog sound signal is amplified by the amplifier 53 and thereafter converted into voice by the receiver 54 to produce sounds.

At the time of transmission, after voice input to the transmitter 51 is converted into an analog sound signal, the analog sound signal is amplified by the amplifier 52 and then converted by the A-D conversion unit 43 into digital data, which data is supplied to the DSP 41. The DSP 41 supplies the input voice data as the digital data to the encoder 23 after conducting processing (voice codec processing), such as insertion of the data into a predetermined time slot, with respect to the data. The input voice data is encoded and modulated by the encoder 23 and the modulated data is supplied to the transmission unit 13. With a frequency converted with a frequency converting signal from the synthesizer unit 14, the modulated data is converted into a signal having a radio frequency band, which signal is transmitted by radio through the shared unit 11 and the antenna 55.

As described in the foregoing, and taking into consideration that the fact, with common portable telephones, and except in special circumstances keying is more required in the wait state (e.g., for registering or reading personal information such as a dial number of a calling destination) than in the on-line state. The present embodiment enables a digital portable telephone, in which the DSP 41 performs the voice codec function during ordinary calling, to implement the voice recognition function in the wait state.

FIG. 3 is a flowchart for use in explaining the processing conducted by the microcomputer 21, t he main part of the present embodiment, for detecting the wait state and the on-line state. This detection function will be described with reference to FIG. 3.

The microcomputer 21 sees if the "start" key (call start indication) is entered through the operation unit 30 (Step 301) and sets the telephone to the off-hook state when the "start" key is entered (Step 302). In other words, the microcomputer 21 sets a hook status flag indicative of the state of hook to the off-hook state.

With no entry of the "start" key at Step 301, the microcomputer 21 sees if the "end" key (call end indication) is entered through the operation unit 30 (Step 303). When the "end" key is entered, the microcomputer 21 sets the telephone to the on-hook state (Step 304). In other words, the microcomputer sets the hook status flag indicative of the state of hook to the on-hook state. With no entry of the "end"key, the microcomputer 21 determines whether data applied from the decoder 22 is voice information or no t (Step 305).

When the determination is made that the data applied from the decoder 22 to the microcomputer 21 is voice information, further determination is made whether the telephone is in the off-hook state or not (Step 306). This determination is made based on the contents of the hook status flag. Then, when in the off-hook state, the microcomputer 21 notifies the DSP 41 of the "on-line state" (Step 307). If not in the off-hook state, the microcomputer 21 notifies the DSP 41 of the "wait state" (Step 308).

On the other hand, when the determination is made at Step 305 that the data output from the decoder 22 is not voice information, the microcomputer 21 notifies the DSP 41 that the portable telephone is in the "wait" state (Step 308).

Thus, the microcomputer 21 detects the "on-line state" when the digital portable telephone is in the off-hook state and the data from the decoder 22 is voice information and otherwise detects the "wait state" to notify the DSP 41 of the detection results.

Operation of the DSP 41 will be described in the following with reference to the flowchart of FIG. 4.

The DSP 41 continuously monitors the state information indicative of the "wait state" or the "on-line state" of the digital portable telephone notified by the microcomputer 21 (Steps 401, 402). When in the "on-line state", the DSP 41 is controlled so as to exclusively conduct voice codec processing (voice codec processing mode).

More specifically, in the "on-line state", the DSP 41 extracts voice information from demodulated data information from the decoder 22 and sends out the extraction results to the receiver 54 through the D-A conversion unit 42 and the amplifier 53, while conducting voice codec processing by processing a sound signal from the transmitter 51 applied through the A-D conversion unit 43 and supplying the processed sound signal to the encoder 23 (Step 403).

On the other hand, in the "wait state", the DSP 41 is controlled to exclusively conduct voice recognition processing (voice recognition processing mode). The DSP 41, when detecting the "wait state" at Step 401, determines whether voice is input from the transmitter 51 through the amplifier 52 and the A-D conversion unit 43 (Step 404). With no input of voice, the routine returns to Step 401.

With voice input from the transmitter 51, the DSP 41 conducts processing for analyzing and recognizing the input voice (Step 405). For example, in place of inputting dial numbers by entering numeric keys on the keyboard unit 30a of the operation unit 30, when dial number information is input by means of voice after entering the "voice" key, the DSP 41 performs processing for analyzing and recognizing the input voice.

When a determination is made based on the results of the voice analysis and recognition processing that the information input by means of voice is dial information or other valid information (e.g. information indicative of name of a destination)(Step 406), the DSP 41 outputs the voice recognition results to the microcomputer 21 (Step 407). The microcomputer 21 responsively controls the display unit 30b of the operation unit 30 to display dial numbers or the like, which are voice recognition results. The DSP 41 thereafter ends the voice recognition processing to return to Step 401.

It is also possible to allow the DSP 41 in the wait state to conduct voice recognition with respect not only to dial number information but also to other voice information, such as information indicative of a name of a destination and information indicating read of registered dial information and registration of dial information.

Description will be given of processing to be conducted by the microcomputer 21 at the time of receiving voice recognition results from the DSP 41 with reference to the flowchart of FIG. 5.

First, upon receiving input of voice recognition results from the DSP 41 (Step 501), the microcomputer 21 controls the display unit 30b of the operation unit 30 to display the input voice recognition results (dial number, name of a destination, etc.) (Step 502) to enable a user who has input the voice to confirm the information.

Then, following the indication applied through the operation unit 30 or applied by means of voice (Step 503), the microcomputer 21 performs processing based on the input voice recognition results. In a case where the voice recognition result is dial number information and registration of the dial information is indicated, the microcomputer conducts processing for registering the dial number information as the voice recognition result (Step 504).

When the voice recognition result is the destination name information and read of dial information is indicated, the microcomputer 21 conducts processing for reading a dial number corresponding to the destination name information as the voice recognition result (Step 505). In a case where the voice recognition result is dial number information and calling is indicated, calling processing is conducted according to the dial number as the voice recognition result (Step 506).

Thus, the present embodiment enables one DSP 41 in a small package to realize the voice codec and voice recognition functions by limiting the functions of the DSP 41 such that it is operable in a voice recognition function mode when a portable telephone is in the wait state and operable in the voice codec function mode when the telephone is in the on-line state.

As described in the foregoing, according to the present invention, a digital signal processor (DSP) contained in a portable telephone operates in the voice recognition function mode when the telephone is in the "wait state" and in the voice codec function mode when the telephone is in the "on-line state". This allows one DSP in a small package to realize both the voice codec function and the voice recognition function. It is therefore possible to reduce the size, weight and cost of a portable telephone even with the voice recognition function because such a telephone needs to contain only one DSP in a small package.

Although the invention has been illustrated and described with respect to an exemplary embodiment thereof, it should be understood by those skilled in the art that the foregoing and various other changes, omissions and additions may be made therein and thereto, with out departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A digital portable telephone comprising:
   a single-chip digital signal processor for performing voice codec processing with respect to transmission voice data which is input through a transmitter and digitalized and reception demodulated data obtained by decoding a reception radio signal;
   encoding means for encoding transmission voice data having been subjected to voice codec processing to generate modulated data;
   transmission means for converting said modulated data into a signal with a radio frequency and transmitting the signal by radio;
   means for converting voice information extracted from the reception demodulated data by the voice codec processing into an analog signal and outputting the analog signal to a receiver;
   operation means for operating input of a dial number of a destination and input for transmission and reception operation, and for displaying various kinds of information; and
   detection means for detecting whether the telephone is in the on-line state or the wait state based on said reception demodulated data and operation information from said operation means to notify said digital signal processor of either state;
   said digital signal processor being operable in only a voice recognition processing mode for recognizing the contents of voice input through said transmitter when notified of the wait state by said detection means; and
   said digital signal processor being operable in only a voice codec processing mode for conducting said voice codec processing with respect to demodulated data from a decoder or voice data from said transmitter converted into a digital signal when notified of the on-line state.

2. The digital portable telephone according to claim 1, wherein said detection means detects the on-line state only when start of a call is indicated by said operation means and said demodulated data is voice information and otherwise detects the wait state.

3. The digital portable telephone according to claim 1, wherein said detection means notifies the on-line state only when the telephone is in the off-hook state and said demodulated data is voice information and otherwise notifies the wait state.

4. The digital portable telephone according to claim 1, wherein said detection means
   determines whether indication of call start is input by said operation means and sets the telephone to the off-hook state when the indication of call start is input;
   determines whether indication of call end is input by said operation means and sets the telephone to the on-hook state when the indication of call end is input;
   determines whether said demodulated data is voice information;
   further determines whether the telephone is in the off-hook state when said demodulated data is voice information and notifies the state of call when in the off-hook state; and
   notifies the wait state when said demodulated data is not voice information or when said demodulated data is voice information but the telephone is not in the off-hook state.

5. The digital portable telephone according to claim 1, wherein said digital signal processor
   determines in the wait state whether voice data is input from said transmitter;
   when voice data is input, analyzes the voice data to conduct recognition processing; and
   determines based on the recognition processing result whether the data is valid information or not and outputs the recognition result when it is valid.

6. The digital portable telephone according to claim 1, further comprising control means for receiving input of voice recognition results obtained by said digital signal processor and displaying the recognition results on a display unit of said operation means.

7. The digital portable telephone according to claim 6, wherein said control means conducts predetermined processing based on the voice recognition results input from said digital signal processor and the contents of indication input from said operation means.

8. A digital portable telephone comprising:
   a single-chip digital signal processor for performing voice codec processing with respect to transmission voice data which is input through a transmitter and digitalized and reception demodulated data obtained by decoding a reception radio signal;
   encoding means for encoding transmission voice data having been subjected to voice codec processing to generate modulated data;
   transmission means for converting said modulated data into a signal with a radio frequency and transmitting the signal by radio;
   means for converting voice information extracted from the reception demodulated data by the voice codec processing into an analog signal and outputting the analog signal to a receiver;
   operation means for operating input of a dial number of a destination and input for transmission and reception operation, and for displaying various kinds of information; and
   detection means for detecting whether the telephone is in the on-line state or the wait state based on said reception demodulated data and operation information from said operation means to notify said digital signal processor of either state;
   wherein said digital signal processor is operable in only a voice recognition processing mode for recognizing the contents of voice input through said transmitter when notified of the wait state by said detection means; and
   wherein said digital signal processor is operable in only a voice codec processing mode for conducting said voice codec processing with respect to demodulated data from a decoder or voice data from said transmitter converted into a digital signal when notified of the on-line state; and wherein said detection means notifies the on-line state only when (1) the telephone is in the on-hook state and (2) said demodulated data is voice information, and otherwise notifies the wait state.

9. The digital portable telephone according to claim 8, wherein said detection means determines whether indication of call start is input by said operation means and sets the telephone to the off-hook state when the indication of call start is input;

determines whether indication of call end is input by said operation means and sets the telephone to the on-hook state when the indication of call end is input;

determines whether said demodulated data is voice information;

further determines whether the telephone is in the off-hook state when said demodulated data is voice information and notifies the state of call when in the off-hook state; and notifies the wait state when said demodulated data is not voice information or when said demodulated data is voice information but the telephone is not in the off-hook state; and said digital signal processor determines in the wait state whether voice data is input from said transmitter;

when voice data is input, analyzes the voice data to conduct recognition processing; and determines based on the recognition processing result whether the data is valid information or not and outputs the recognition result when it is valid.

10. The digital portable telephone according to claim 8, further comprising control means for receiving input of voice recognition results obtained by said digital signal processor and displaying the recognition results on a display unit of said operation means.

11. In a digital portable telephone having a single-chip digital signal processor which conducts voice codec processing with respect to transmission voice data input through a transmitter and digitalized, and reception demodulated data obtained by decoding a reception radio signal, a method for switching and controlling functions of the digital signal processor, comprising the steps of:

detecting the on-line state when the telephone is in the off-hook state and said demodulated data is voice information and otherwise detecting the wait state;

setting the operation mode of said single-chip digital signal processor to only a voice codec processing mode for conducting said voice codec processing when detecting said on-line state; and setting the operation mode of said single-chip digital signal processor to only a voice recognition processing mode for recognizing the contents of voice input through the transmitter when detecting said wait state.

12. The method for switching and controlling functions of a digital signal processor in a digital portable telephone according to claim 11, comprising the steps of:

determining whether indication of call start is input by operation means and setting the telephone to the off-hook state when the indication of call start is input;

determining whether indication of call end is input by said operation means and setting the telephone to the on-hook state when the indication of call end is input;

determining whether said demodulated data is voice information;

further determining whether the telephone is in the off-hook state when said demodulated data is voice information and notifying the state of call when in the off-hook state; and notifying the wait state when said demodulated data is not voice information or when said demodulated data is voice information but the telephone is not in the off-hook state.

13. The method for switching and controlling functions of a digital signal processor in a digital portable telephone according to claim 11, wherein said digital signal processor determines in the wait state whether voice data is input from said transmitter;

when voice data is input, analyzes the voice data to conduct recognition processing; and determines based on the recognition processing result whether the data is valid information and outputs the recognition result when it is valid.

* * * * *